(12) United States Patent
Stephenson

(10) Patent No.: US 7,373,363 B2
(45) Date of Patent: May 13, 2008

(54) METHOD OF MANAGING MODIFICATION OF CONFIGURATION STATES OF RESOURCES IN A DYNAMIC DATA CENTER

(75) Inventor: Bryan Stephenson, Alviso, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 473 days.

(21) Appl. No.: 10/613,816

(22) Filed: Jul. 3, 2003

(65) Prior Publication Data
US 2005/0004929 A1 Jan. 6, 2005

(51) Int. Cl.
*G06F 12/00* (2006.01)
(52) U.S. Cl. ...................................... 707/203
(58) Field of Classification Search ............... 707/1, 707/10, 203; 714/15, 57, 3
See application file for complete search history.

(56) References Cited

U.S. PATENT DOCUMENTS 5,247,664 A * 9/1993 Thompson et al. ........... 707/10
5,761,505 A * 6/1998 Golson et al. ............... 713/100
5,859,977 A 1/1999 Nishiyama et al.
6,378,027 B1 4/2002 Bealkowski et al.

FOREIGN PATENT DOCUMENTS

WO    WO 02/033539 A2    4/2002

* cited by examiner

*Primary Examiner*—Cheyne D Ly

(57) ABSTRACT

A method of managing modification of configuration states of a plurality of resources of multiple types in a dynamic data center is disclosed. A modification policy is created for the resources. Moreover, a new modification for a configuration state of resources of a particular type is obtained. The new modification is automatically performed to the configuration state of the resources of the particular type based on the modification policy. A resource pool is utilized so that performance of the new modification to the configuration state is achieved without degrading a level of service provided by the resources of the particular type. Further, the resource pool includes a plurality of available resources of multiple types.

26 Claims, 3 Drawing Sheets

METHOD OF MANAGING MODIFICATION OF CONFIGURATION STATES OF RESOURCES IN A DYNAMIC DATA CENTER

BACKGROUND OF THE INVENTION

1. Field of the Invention

The present invention generally relates to data centers. More particularly, the present invention relates to managing modification of configuration states of resources in a dynamic data center.

2. Related Art

Today, there are many types of firmware, operating systems, and applications that can be utilized in various types of computational devices. The configuration state of a computational device represents the firmware, operating system, and applications installed in the computational device, as well as the values for customer-specifiable operational parameters of the device. Typically, modifications to the firmware, operating systems, and applications are periodically released. These modifications can be classified as an update, a patch, a fix, or an upgrade. For example, a security patch may be released to address a security vulnerability of an operating system. After performing the modification to the configuration state of the computational device, it may be necessary to reboot the computational device. Maintaining the configuration state of one computational device as modifications are made available is a manageable task.

However, in a data center environment, this task is difficult and tedious for a data center administrator. The data center may have 100's or 1000's of resources that are providing a service. For example, the service may be a web site operation. Typically, there are various types of resources. Examples of these various types of resources include a first web server having a first type of operating system, a second web server having a second type of operating system, a load balancer, and a firewall. When a new modification for the configuration state of a particular type of resource is made available, the data center administrator has to manually perform the modification to the configuration state of each resource of the particular type, leading to inefficient use of time. Moreover, since the resource may have to be taken offline before performing the modification to the configuration state of the resource or may have to be rebooted after performing the modification to the configuration state of the resource, the level of service provided by the resource is negatively affected.

SUMMARY OF THE INVENTION

A method of managing modification of configuration states of a plurality of resources of multiple types in a dynamic data center is disclosed. A modification policy is created for the resources. Moreover, a new modification for a configuration state of resources of a particular type is obtained. The new modification is automatically performed to the configuration state of the resources of the particular type based on the modification policy. A resource pool is utilized so that performance of the new modification to the configuration state is achieved without degrading a level of service provided by the resources of the particular type. Further, the resource pool includes a plurality of available resources of multiple types.

BRIEF DESCRIPTION OF THE DRAWINGS

The accompanying drawings, which are incorporated in and form a part of this specification, illustrate embodiments of the invention and, together with the description, serve to explain the principles of the present invention.

DETAILED DESCRIPTION OF THE INVENTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

Figure 1:
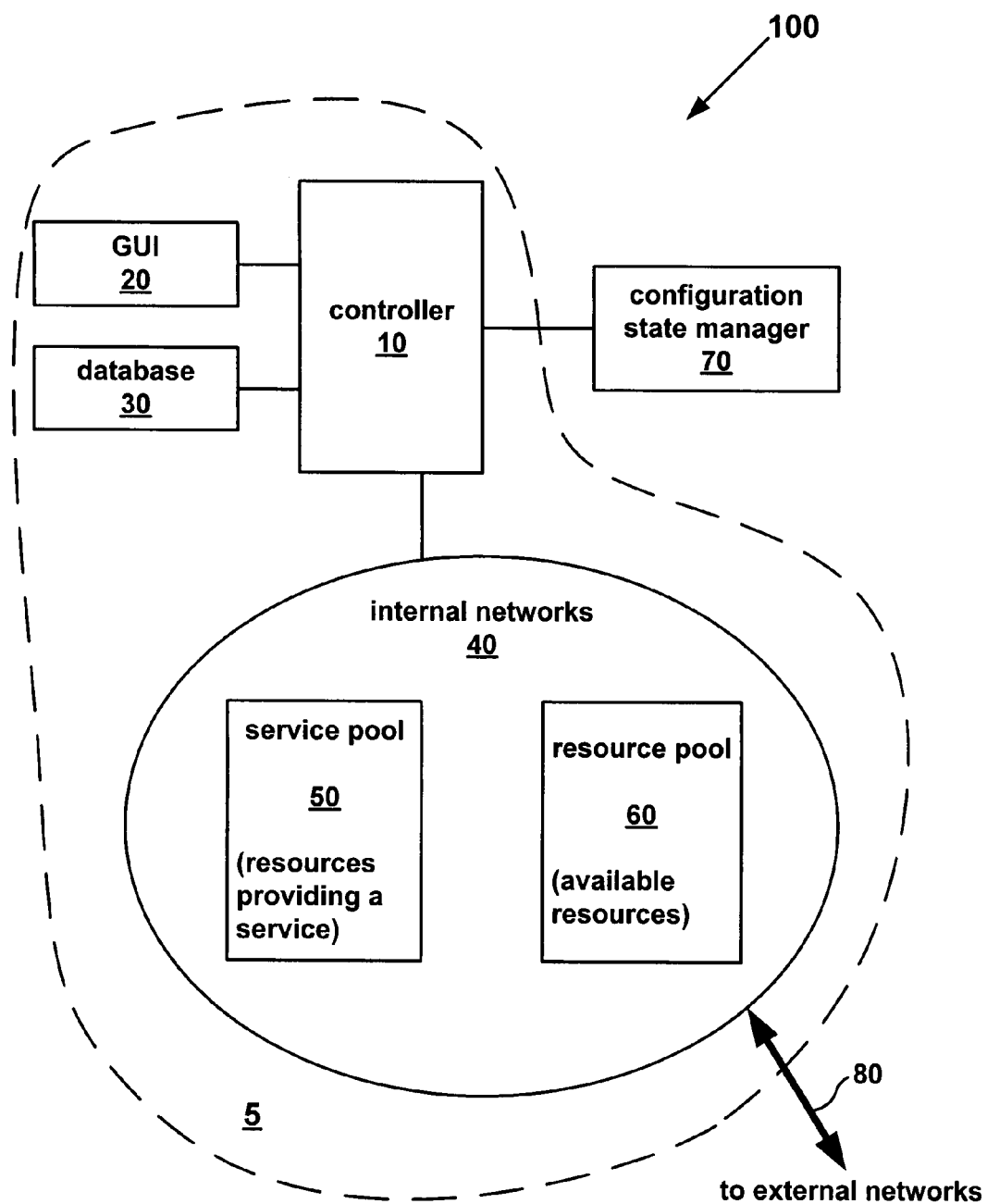
FIG. 1 illustrates a system in accordance with an embodiment of the present invention, showing a dynamic data center and a configuration state manager.

FIG. 1 illustrates a system 100 in accordance with an embodiment of the present invention, showing a dynamic data center 5 and a configuration state manager 70. The system 100 includes a dynamic data center 5 and a configuration state manager 70. In this system 100, modifications to the configuration state of resources of the dynamic data center 5 can be performed in an automatic manner and in a transparent manner with respect to the level of service provided by these resources. The configuration state can include a firmware configuration state, an operating system configuration state, and an application configuration state.

The dynamic data center 5 has a controller 10, a graphical user interface (GUI) 20, a database 30, a plurality of internal networks 40, and a communication link 80 to communicate with external networks (e.g., the Internet). The internal networks 40 include a plurality of resources that are networked. Groups of these resources can be configured to provide a particular service (e.g., web site operation). If a resource is providing a service, the resource is included in the service pool 50 representing resources that are providing a service. If a resource is not providing a service, the resource is included in the resource pool 60 representing available resources that can be configured to provide a service. In an embodiment, there are various types of resources. Examples of these various types of resources include a first server having a first type of operating system, a second server having a second type of operating system, a load balancer, a firewall, and a VPN (virtual private network) appliance.

Moreover, the dynamic data center 5 has the capability to provision an available resource from the resource pool 60 to provide a service, whereas this provisioning can be performed via the controller 10. In an embodiment, the dynamic data center 5 is a utility data center developed by the Hewlett-Packard Company. In particular, the controller 5 enables the control and configuration of the resources in the internal networks 40. The GUI 20 enables a user to create a desired service, which is then provided by a group of resources under the control of the controller 5. The database 30 includes information associated with each resource in the service pool 50 and each available resource in the resource pool 60. This information includes the configuration state of each resource in the service pool 50 and of each available resource in the resource pool 60.

When a new modification (e.g., an update, a patch, a fix, or an upgrade) for a configuration state of resources of a particular type is made available, the configuration state manager 70 automatically performs the new modification to the configuration state of the resources of the particular type based on a modification policy. The configuration state manager 70 utilizes the resource pool 60 so that performance of the new modification to the configuration state is achieved without degrading a level of service provided by the resources of the particular type. Moreover, the configuration state manager 70 interfaces with the controller 10 to perform the new modification to the configuration state of the resources of the particular type. This automation and transparency reduces the amount of time that a data center administrator has to devote to maintaining the configuration state of resources in the dynamic data center 5. The configuration state manager 70 can be implemented in hardware, software, or a combination thereof.

The modification policy is created to specify various parameters for controlling operation of the configuration state manager 70. The GUI 20 can be utilized to create the modification policy. Resources can be prioritized so that the modification to the configuration state of particular groups of resources is performed before being performed to the configuration state of other groups of resources. Moreover, particular types of modifications can be given priority over other types of modifications. For example, the modification policy may indicate to the configuration state manager 70 that a security patch be installed in the resources of the dynamic data center 5 before an application upgrade is installed.

Figure 2:
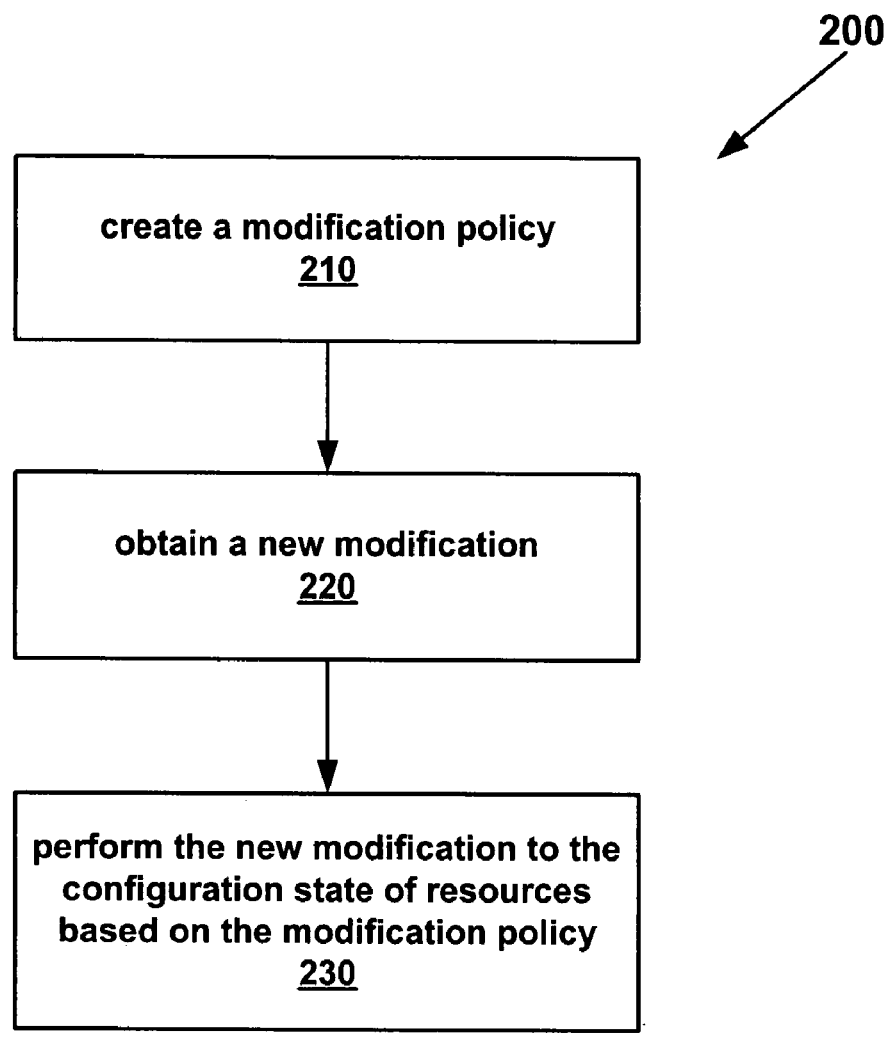
FIG. 2 illustrates a flow chart showing a method of managing modification of configuration states of a plurality of resources of multiple types in a dynamic data center in accordance with an embodiment of the present invention.

FIG. 2 illustrates a flow chart showing a method 200 of managing modification of configuration states of a plurality of resources of multiple types in a dynamic data center in accordance with an embodiment of the present invention.

At Step 210, the modification policy for the resources is created. Moreover, at Step 220, a new modification for a configuration state of resources of a particular type is obtained. In one embodiment, the new modification is tested to verify that it will not cause problems after the new modification is performed to the configuration state of the resources of the particular type. In another embodiment, it is determined whether the new modification has been certified for use in the resources of the dynamic data center, eliminating the need for testing the new modification.

Continuing, at Step 230, the configuration state manager 70 (FIG. 1) automatically performs the new modification to the configuration state of the resources of the particular type based on the modification policy without degrading a level of service provided by the resources of the particular type. In particular, the configuration state manager 70 utilizes the resource pool 60 (FIG. 1) and the capability of the dynamic data center 5 (FIG. 1) to provision an available resource from the resource pool 60 to provide a service.

Figure 3:
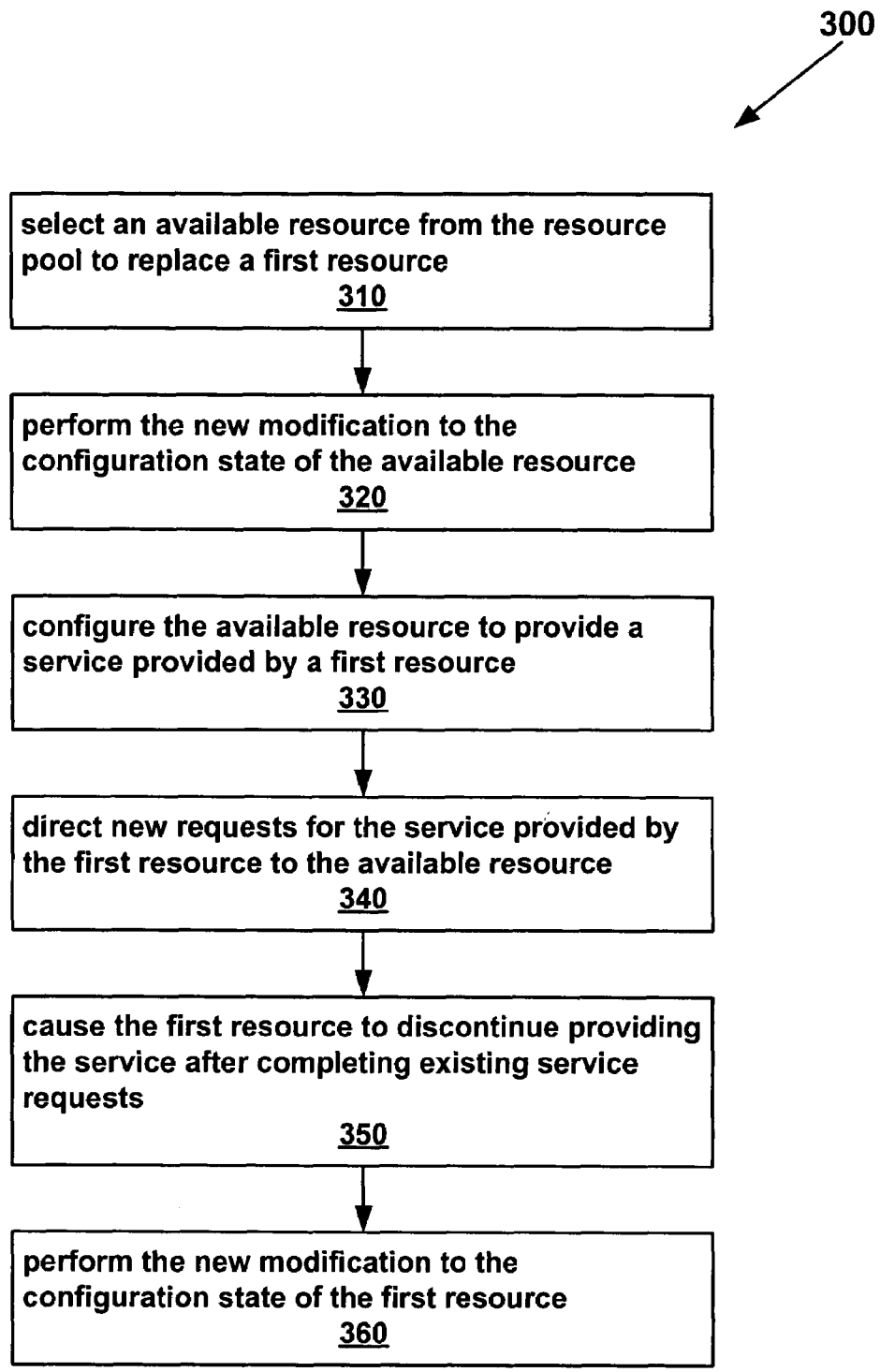
FIG. 3 illustrates a flow chart showing a method of performing a new modification to the configuration state of a resource in accordance with an embodiment of the present invention.

FIG. 3 illustrates a flow chart showing a method 300 of performing a new modification to the configuration state of a resource in accordance with an embodiment of the present invention. Moreover, FIG. 3 provides additional details about the execution of Step 230 of FIG. 2. Reference is made to FIG. 1.

At Step 310, since the new modification (e.g., an update, a patch, a fix, or an upgrade) for the configuration state of resources of a particular type has been received, the configuration state manager 70 selects an available resource of the particular type from the resource pool 60 to replace a first resource of the particular type based on the modification policy. The first resource provides a service (e.g., a web site operation). The database 30 (FIG. 1) enables the configuration state manager 70 to determine whether the dynamic data center 5 has resources of the particular type and to determine the location of those resources of the particular type. The configuration state manager 70 selects the first resource from the resources of the particular type based on the modification policy. As an example, the first resource is web server1 in the service pool 50 while the available resource is web serverA from the resource pool 60.

Continuing, at Step 320, the configuration state manager 70 performs the new modification to the configuration state of the available resource (e.g., web serverA). At Step 330, the configuration state manager 70 configures the available resource (e.g., web serverA) to provide a service provided by the first resource (e.g., web server1). For example, the web server1 may send a copy of its applications and settings to the web serverA.

At Step 340, the configuration state manager 70 directs new requests for the service provided by the first resource (e.g., web server1) to the available resource (e.g., web serverA). In particular, the configuration state manager 70 can configure a load balancer to send new requests to web serverA and to stop sending new requests to web server1. Moreover, at Step 350, the configuration state manager 70 causes the first resource (e.g., web server1) to discontinue providing the service after completing the existing service requests. That is, the web server1 drains its existing requests and then notifies the configuration state manager 70 when it has drained its existing requests.

Furthermore, at Step 360, the configuration state manager 70 performs the new modification to the configuration state of the first resource (e.g., web server1). Because the available resource (e.g., web serverA) has replaced the first resource (e.g., web server1) in providing the service, the level of service is unaffected. Since the first resource (e.g., web server1) is no longer providing a service, the first resource (e.g., web server1) represents another available resource from the resource pool 60. Hence, the configuration state manager 70 can utilize the first resource (e.g., web server1) to perform the new modification to the configuration state of another resource of the particular type. That is, this can continue in a similar manner until the new modification is performed on all the resources in a group of resources of the particular type. As a result, the new modification to the configuration state of resources of the particular type is performed in an automatic manner and in a transparent manner with respect to the level of service provided by these resources.

In an embodiment, the present invention is configured as computer-executable instructions stored in a computer-readable medium, such as a magnetic disk, CD-ROM, an optical medium, a floppy disk, a flexible disk, a hard disk, a magnetic tape, a RAM, a ROM, a PROM, an EPROM, a flash-EPROM, or any other medium from which a computer can read.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of managing modification of configuration states of a plurality of resources of multiple types in a dynamic data center, said method comprising:
    creating a modification policy for said resources;
    obtaining a new modification for configuration states of resources of a particular type;
    automatically performing said new modification to said configuration states of said resources of said particular type based on said modification policy by utilizing a resource pool without degrading a level of service provided by said resources of said particular type by performing said new modification to a configuration state of an available resource and by re-directing new requests for a service provided by a first resource to said available resource, wherein said resource pool includes a plurality of available resources of multiple types;
    wherein said automatically performing said new modification includes:
    selecting said available resource of said particular type from said resource pool to replace said first resource of said particular type, wherein said performing of said new modification to said configuration state of said available resource of said particular type is enabled;
    configuring said available resource to provide said service provided by said first resource of said particular type, wherein said re-directing of said new requests for said service provided by said first resource to said available resource is enabled;
    causing said first resource to discontinue providing said service after said available resource completes existing service requests originally intended for said first resource; and
    performing said new modification to a configuration state of said first resource, wherein said first resource represents another available resource from said resource pool.

2. The method as recited in claim 1 wherein said dynamic data center is a utility data center.

3. The method as recited in claim 1 wherein said configuration state includes a firmware configuration state.

4. The method as recited in claim 1 wherein said configuration state includes an operating system configuration state.

5. The method as recited in claim 1 wherein said configuration state includes an application configuration state.

6. The method as recited in claim 1 wherein said new modification is one of an update, a patch, a fix, and an upgrade.

7. The method as recited in claim 1 wherein said plurality of resources includes a resource that is one of a server, a load balancer, a firewall, and a VPN (virtual private network) appliance.

8. The method as recited in claim 1 wherein said obtaining said new modification includes:
    testing said new modification.

9. The method as recited in claim 1 wherein said obtaining said new modification includes:
    determining whether said new modification is certified for use in said dynamic data center.

10. A computer-readable medium comprising computer-executable instructions stored therein for performing a method of managing modification of configuration states of a plurality of resources of multiple types in a dynamic data center, said method comprising:
    creating a modification policy for said resources;
    obtaining a new modification for configuration states of resources of a particular type;
    automatically performing said new modification to said configuration states of said resources of said particular type based on said modification policy by utilizing a resource pool without degrading a level of service provided by said resources of said particular type by performing said new modification to a configuration state of an available resource and by re-directing new requests for a service provided by a first resource to said available resource, wherein said resource pool includes a plurality of available resources of multiple types;
    wherein said automatically performing said new modification includes:
    selecting said available resource of said particular type from said resource pool to replace said first resource of said particular type, wherein said performing of said new modification to said configuration state of said available resource of said particular type is enabled;
    configuring said available resource to provide said service provided by said first resource of said particular type, wherein said re-directing of said new requests for said service provided by said first resource to said available resource is enabled;
    causing said first resource to discontinue providing said service after said available resource completes existing service requests originally intended for said first resource; and
    performing said new modification to a configuration state of said first resource, wherein said first resource represents another available resource from said resource pool.

11. The computer-readable medium as recited in claim 10 wherein said dynamic data center is a utility data center.

12. The computer-readable medium as recited in claim 10 wherein said configuration state includes a firmware configuration state.

13. The computer-readable medium as recited in claim 10 wherein said configuration state includes an operating system configuration state.

14. The computer-readable medium as recited in claim 10 wherein said configuration state includes an application configuration state.

15. The computer-readable medium as recited in claim 10 wherein said new modification is one of an update, a patch, a fix, and an upgrade.

16. The computer-readable medium as recited in claim 10 wherein said plurality of resources includes a resource that is one of a server, a load balancer, a firewall, and a VPN (virtual private network) appliance.

17. The computer-readable medium as recited in claim 10 wherein said obtaining said new modification includes:
    testing said new modification.

18. The computer-readable medium as recited in claim 10 wherein said obtaining said new modification includes:
determining whether said new modification is certified for use in said dynamic data center.

19. A system comprising:
a dynamic data center including:
a service pool including a plurality of resources of multiple types, each resource providing a particular service;
a resource pool including a plurality of available resources of multiple types; and
a controller for controlling said resources and said available resources; and
a configuration state manager for;
automatically performing a new modification to configuration states of said resources of a particular type based on a modification policy by utilizing said resource pool without degrading a level of service provided by said resources of said particular type by performing said new modification to a configuration state of an available resource and by re-directing new requests for a service provided by a first resource to said available resource;
wherein said automatically performing said new modification includes:
selecting said available resource of said particular type from said resource pool to replace said first resource of said particular type, wherein said performing of said new modification to said configuration state of said available resource of said particular type is enabled;
configuring said available resource to provide said service provided by said first resource of said particular type, wherein said re-directing of said new requests for said service provided by said first resource to said available resource is enabled;
causing said first resource to discontinue providing said service after said available resource completes existing service requests originally intended for said first resource; and
performing said new modification to a configuration state of said first resource, wherein said first resource represents another available resource from said resource pool.

20. The system as recited in claim 19 further comprising a graphical user interface to enable creation of said modification policy.

21. The system as recited in claim 19 wherein said dynamic data center is a utility data center.

22. The system as recited in claim 19 wherein said configuration state includes a firmware configuration state.

23. The system as recited in claim 19 wherein said configuration state includes an operating system configuration state.

24. The system as recited in claim 19 wherein said configuration state includes an application configuration state.

25. The system as recited in claim 19 wherein said new modification is one of an update, a patch, a fix, and an upgrade.

26. The system as recited in claim 19 wherein said plurality of resources includes a resource that is one of a server, a load balancer, a firewall, and a VPN (virtual private network) appliance.

* * * * *

UNITED STATES PATENT AND TRADEMARK OFFICE
CERTIFICATE OF CORRECTION

| | |
|---|---|
| PATENT NO. | : 7,373,363 B2 |
| APPLICATION NO. | : 10/613816 |
| DATED | : May 13, 2008 |
| INVENTOR(S) | : Bryan Stephenson |

It is certified that error appears in the above-identified patent and that said Letters Patent is hereby corrected as shown below:

In column 7, line 14, in Claim 19, after "for" delete ";" and insert -- : --, therefor.

Signed and Sealed this

Twenty-ninth Day of July, 2008

JON W. DUDAS
*Director of the United States Patent and Trademark Office*